Feb. 10, 1942.   H. F. JORDAN   2,272,175
METHOD AND APPARATUS FOR FILTERING
Filed Oct. 1, 1938
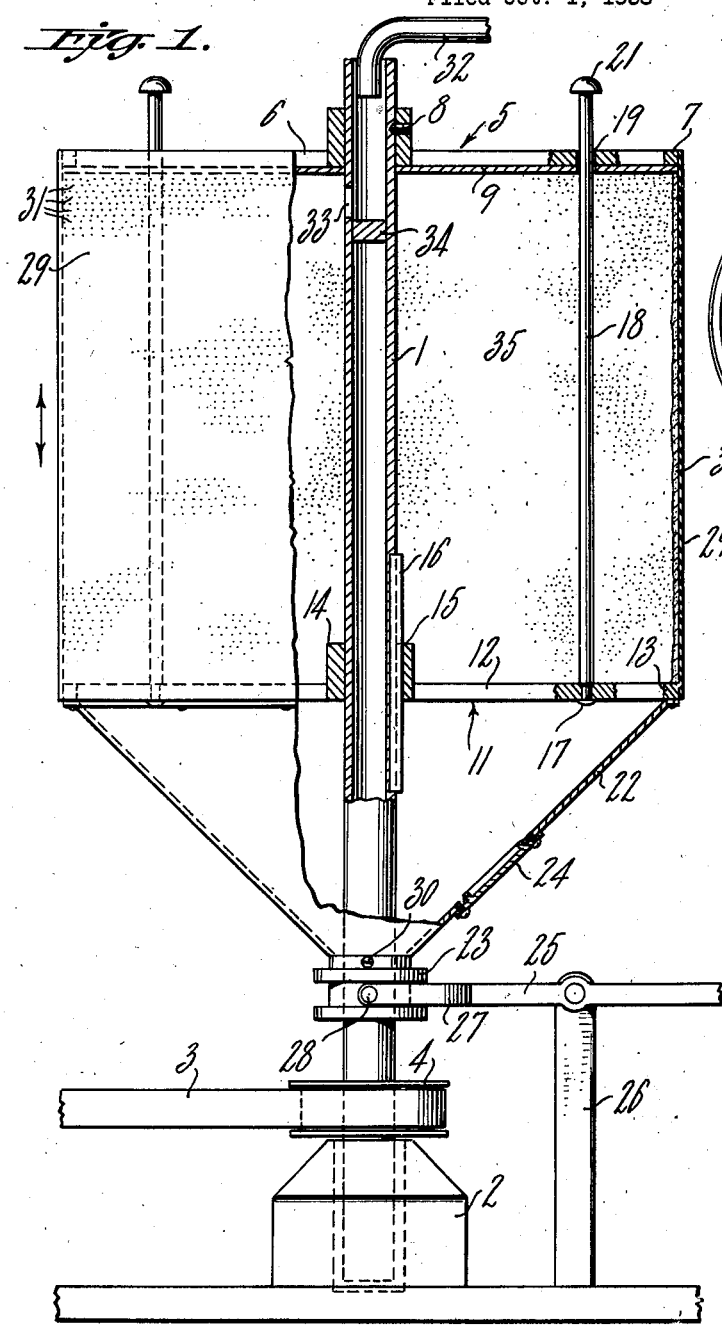
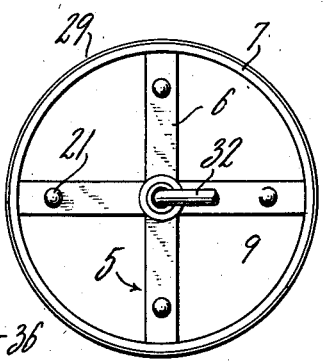
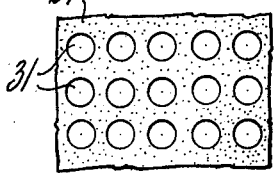
INVENTOR.
HUBERT F. JORDAN
BY Gourley + Budlong
ATTORNEYS Patented Feb. 10, 1942

2,272,175

UNITED STATES PATENT OFFICE 2,272,175

METHOD AND APPARATUS FOR FILTERING

Hubert F. Jordan, Nutley, N. J., assignor, by mesne assignments, to United States Rubber Company, New York, N. Y., a corporation of New Jersey Application October 1, 1938, Serial No. 232,771

2 Claims. (Cl. 210—76)

This invention relates to methods and apparatus for filtering, and more particularly for centrifugally filtering or separating comminuted material which is suspended or dispersed in a fluid medium.

Finely divided material suspended in a liquid has previously been centrifugally filtered by introducing the material into a centrifugal filtering apparatus and expressing the filtrate therefrom through a filter medium which is attached to a rotatable rigid frame. The usual material employed as a filtering medium in such constructions is wire fabric or woven fibrous fabric of sufficiently fine mesh to retain the suspended particles within the apparatus while allowing the filtrate to be separated by centrifugal force. After using the apparatus for filtering a quantity of material, the filter medium becomes less efficient, that is, the interstices between the wires or fibres of the material used as the medium become clogged with solid particles. As a result, it is necessary to clean out the filtering medium, which step involves, especially in the case of fibrous fabric, removing the material from the framework of the apparatus and washing it to disengage the clogged particles from the holes in which they are entrapped, and finally replacing the material. Alternatively, especially in the case of wire mesh, fluid may be driven under pressure from jets through certain of the interstices in the material to unclog it. In practice, however, a great number of the interstices in the filter medium become so tightly clogged with solid material that fluid pressure alone fails to clean it.

In filtering comminuted material it is at times desired to separate and retain particles of a selected minimum size and to permit particles smaller than that size to pass through the filter in suspension with the filtrate. With previous centrifugal filters, this was accomplished by employing a filter medium having a mesh size corresponding to the selected minimum size of the particles to be retained within the apparatus. When it was desired to let larger particles pass through the filter medium, it was necessary to replace the original medium with material having a coarser mesh.

According to the present invention, a centrifugal filter is provided in which the filtering medium may be completely cleaned in situ, without removal from the apparatus. The apparatus comprises, generally, a rotatable shaft, a head secured thereto and rotatable with the shaft, and a second head also rotatable with the shaft but spaced from the first head and adjustable axially relative thereto. A perforate elastic filtering medium, for example, a perforate or foraminous rubber sheet, is secured to the heads and around the edges thereof so as to enclose the space between the heads, thereby forming a chamber from which the filtrate may be expressed. When the adjustable head is moved axially away from the head which is secured to the shaft, the filter medium is stretched and the perforations therein are thereby enlarged. The degree of adjustment of the movable head may be predetermined to enlarge the perforations in the filter medium to the desired extent.

The apparatus of the present invention may be conveniently and effectively cleaned or washed without removal of the filter medium therefrom. When the perforations are enlarged by stretching the filter medium, the material clogging them is immediately loosened and may be forced out by the application of fluid pressure. The elimination of the necessity for removal of the filter medium during the cleaning step obviously results in increased time and labor efficiency.

In addition, the present device may be so adjusted that when it is in one position particles having a given desired minimum size may be filtered; and in another position the filter medium may be stretched to enlarge the perforations so that the minimum size of the filtered particles is greater than those originally filtered. This result may be accomplished merely by adjustment of the apparatus, and without the necessity for the substitution of a new filter medium.

In the accompanying drawing, a present preferred embodiment of the apparatus according to the invention is illustrated, in which:

Fig. 1 is an elevational view of a centrifugal filter with parts removed;

Fig. 2 is a plan view of the filter shown in Fig. 1;

Fig. 3 is a greatly enlarged plan view of suitable filtering material in relaxed condition; and Fig. 4 is a plan view of the material shown in Fig. 3 in stretched condition.

Referring to the drawing, Figs. 1 and 2 illustrate an application of the principle of the invention to a centrifugal filter having a hollow shaft 1, journaled in a base 2, and which may be driven by a belt 3 engaging a pulley 4 secured to the shaft. The belt 3 may be driven by any suitable driving means, and the upper portion of the shaft may be extended and rotatably supported by convenient means (not shown). An upper head 5 comprising a spider 6 supporting a rim 7 is secured to the upper portion of the shaft by a set screw 8, to constitute an upper support for the filter medium. A cover disc 9 may be conveniently secured to the upper head in any desired manner. An adjustable head 11, similar to the upper head 5 and comprising a spider 12 supporting a rim 13, is spaced from the upper head 5 and secured for rotation with the shaft 1. A collar 14 in the spider 12 has a keyway 15 which slidably engages an axially projecting key 16 on the shaft 1. The lower ends 17 of elongated pins 18 are secured to the arms of the spider 12 and extend upwardly to slidably engage holes 19 which pass through the corresponding arms of the spider 6 and through the disc 9. The upper ends of the elongated pins 18 terminate in stops 21.

Secured to the rim 13, a funnel shaped receptacle 22 terminates downwardly in a double flanged collar 23 encircling the shaft 1. The receptacle 22 is provided with an exit for filtered material which may conveniently take the form of a manhole 24. Adjustability for the head 11 together with the receptacle 22 is provided for by a fork 25 pivoted to a fixed upright 26. The fork 25 is provided with curved tines 27, each having an inwardly projecting pin 28, which extends radially with respect to the shaft 1 and terminates between the flanges of the collar 23. The tines 27 are so spaced so that when the fork is moved they may assume an angular position with respect to the flanges on the collar 23, so that the pins 28 are controlled to move the collar axially along the shaft 1.

An elastic filter medium 29 is secured by any suitable means (not shown) to the heads 5 and 11 respectively, as by attaching it to the external periphery of the rims 7 and 13 respectively. In the embodiment shown in Figs. 1 and 2, the filter medium 29 is in the form of a cylinder enclosing the space between the heads 5 and 11 respectively. The elastic filter medium 29, as shown in Figs. 3 and 4, may conveniently comprise a rubber sheet having perforations 31 therein, and it may be stretched by lowering the adjustable head 11. The medium may be retained in its stretched condition by tightening a set screw 30 on the collar 23. Suitable material for the perforate elastic filter medium is described in U. S. patent to Linscott and Rice No. 2,032,941. In lieu of the perforations 31 the filter medium may be provided with longitudinal cuts or slits, and the perforations 31 may be of any desired size, shape, and arrangement.

For introduction of material to be filtered into the filtering apparatus, a pipe 32 may extend into the upper opening of the hollow shaft 1, and an inlet 33 may be provided in the form of a hole in the upper portion of the shaft below the cover disc 9. In order to insure entrance of the material to be filtered into the apparatus, a plug 34 may be positioned below the inlet 33 within the shaft 1.

In operation, the apparatus as a unit is revolved at the desired speed by the driving belt 3. The material to be filtered is introduced through the pipe 32 and enters the filter chamber, indicated by the numeral 35, through the inlet 33. Centrifugal force drives the material to be filtered against the interior wall of the filter medium 29 and forces the filtrate through the perforations 31 therein, while retaining the filtered material in the form of a filter cake 36. When the filter cake has been built up to form a deposit of the desired thickness, or when the perforations 31 in the filter medium 29 have become clogged, the filter cake may be removed by adjusting the fork 25 to raise the collar 23 on the shaft 1. When the collar 23 is raised, the keyway 15 in the adjustable head 11 rises along the key 16 on the shaft and the entire adjustable head 11, together with the elongated pins 18, is raised. The relative radial positions of the heads 5 and 11 respectively are maintained since the elongated pins 18 slide in the holes 19 and the keyway 15 of the collar 14 slides along the key 16. At the same time, since the filter medium 29 is flexible, folds are produced therein so that pieces of the filter cake then drop into the receptacle 22 from whence they may be removed through the manhole 24. During the filtering operation it may be desirable to support the filter medium with a cylinder of inextensible material, such as wire gauze, to prevent excessive bulging of the elastic sheet 29. If desired, the apparatus may be placed within a cylindrical catch wall (not shown) to control the travel of the filtrate after emerging from the filter medium.

After the filtering operation, the pores 31 in the elastic sheet 29 are often clogged, as above described, with particles of the filtered material. The pores or perforations 31 may conveniently be cleaned and cleared of the clogging material by lowering the head 11 to stretch the sheet, as shown in Fig. 4. Reference to Fig. 4, as contrasted with Fig. 3, shows that a one-way stretch imparted to the sheet changes the circular voids of given diameter to an elliptical shape, in which both the major and minor axes are greater than the original diameter. The material may be retained in its stretched position by tightening the set screw 30 so as to hold down the head 11. It may then be washed while still in situ on the apparatus by any suitable washing means, such as by the introduction of a fluid under pressure therethrough. After the perforations have been cleaned, the head 11 may be returned to its former position and the sheet material 29 relaxed, whereupon the perforations may re-assume their original size and shape.

For separating comminuted material, suspended or dispersed in liquid or air or other fluid medium, into particle groups each having different minimum particle sizes, a portion of the material may first be filtered through the perforations 31 as shown in Fig. 3. The operation may then be stopped and the filtered material removed, after which the filter medium is stretched by lowering the collar 23 and fixing it in its lower position by the set screw 30, the material then being represented by Fig. 4. The material which was removed from the manhole 24 may then be reintroduced, and again filtered, in which case comminuted material having a particle size greater than that of the perforations 31 in Fig. 3, but smaller than that of the perforations shown in Fig. 4, will pass through the medium. It is obvious that when this operation is again repeated with the perforations still larger than those shown in Fig. 4, material having a still different minimum particle size will remain in the filter.

The rubber sheet material described in U. S. Patent No. 2,032,941 (referred to above) has been found suitable for filtering material of very fine particle size; for example, the filter sheet therein described may have perforations ranging in average diameter anywhere from 0.01 to 0.2 mm. and numbering from 1000 to 10,000 per square inch. When slitted material is employed, it is preferable that the slits extend circumferentially, so that when stretched axially the line-like openings may be enlarged to the desired degree.

The sheet rubber may also, if desired, be backed with a stretchable fabric to reduce bowing out of the filter medium 29, which may occur due to the centrifugal action of the apparatus in operation. The perforations 31 may be produced in any desired manner, such as by punching or piercing the sheet material with needles.

The term "rubber" as herein referred to, broadly includes natural or artificial rubber or rubber-like material. The term "filtering comminuted material," is used herein to include broadly the filtration and separation, in the wet or dry state, of particles having different dimensions.

While certain present preferred embodiments of the invention have been shown and described, it will be understood that it may otherwise be embodied within the spirit thereof and within the scope of the appended claims.

Having thus described my invention, what I claim and desire to protect by Letters Patent is:

1. A centrifugal filter comprising a rotatable shaft, a head secured to and rotatable with said shaft, a second head spaced from said first head and mounted on said shaft for rotation therewith and adjustable axially thereon, a filter medium comprising a perforate elastic sheet material secured to said heads and enclosing the space between said heads, and means for moving the adjustable head relative to the first head to stretch the elastic sheet and to enlarge the perforations therein.

2. A centrifugal filter comprising a rotatable shaft, a head secured to and rotatable with said shaft, a second head spaced from said first head and mounted on said shaft for rotation therewith and adjustable axially thereon, a filter medium comprising a perforate elastic sheet material secured to said heads and enclosing the space between said heads, and means for securing the adjustable head in the desired axial position relative to the first head to control the size of the perforations in the filter medium.

HUBERT F. JORDAN.